A. Loumiller,
Harvester Cutter.

No. 52724.

Patented Feb. 20, 1866.

UNITED STATES PATENT OFFICE.

ALPHEUS LOWMILLER, OF JEWETT, OHIO.

IMPROVEMENT IN HARVESTERS.

Specification forming part of Letters Patent No. 52,724, dated February 20, 1866.

*To all whom it may concern:*

Be it known that I, ALPHEUS LOWMILLER, of Jewett, in the county of Harrison and State of Ohio, have invented new and useful Improvements in Cutting Devices for Grain and Grass Harvesters; and I do hereby declare that the following is a full, clear, and exact description thereof, which will enable those skilled in the art to make and use the same, reference being had to the accompanying drawings, forming part of this specification, in which—

Figure 1:
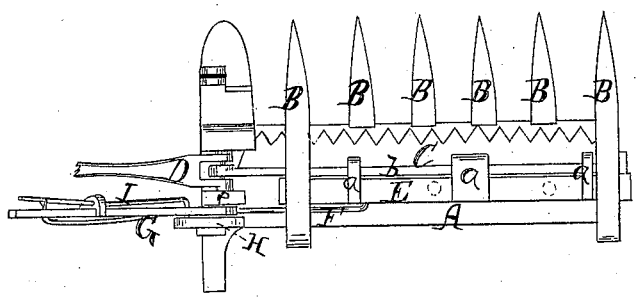
Figure 2:
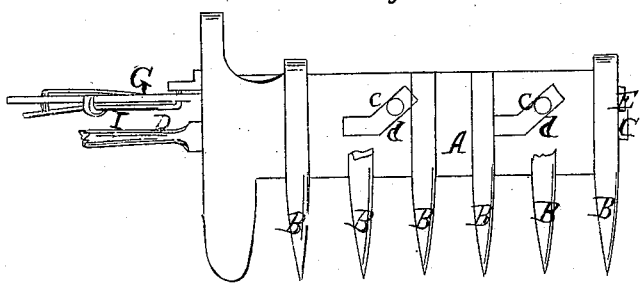
Figure 3:
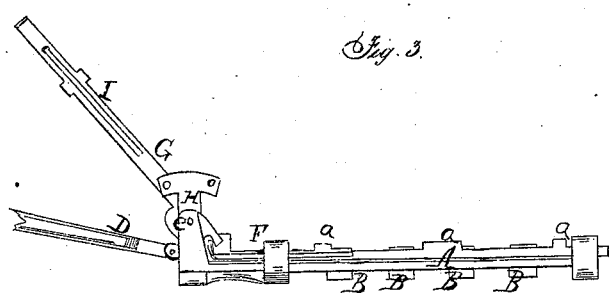

Figure 1 is a plan or top view of my invention; Fig. 2, an inverted plan or bottom view of the same; Fig. 3, a rear view of the same.

Similar letters of reference indicate corresponding parts.

This invention consists in arranging and applying the reciprocating sickle to a grain and grass harvester in such a manner that in case the sickle becomes choked or clogged by grass, grain, or rubbish of any kind the operator or driver may, while in his seat and by manipulating a single lever, draw the sickle back out from the fingers or guards, and thereby relieve them from the obstruction, and then throw the sickle forward again to its proper working position. This same movement of the sickle may also be performed with advantage in protecting the sickle from obstructions of any kind, such as stones, stumps, &c.

A represents the front part of the platform of a harvester, or what is commonly termed the "finger-bar," and B are the fingers attached thereto, as usual.

C is the sickle, which is placed on the finger-bar A, and is operated by a pitman, D, from a crank, as usual, the teeth of the sickle working in slots in the fingers in the ordinary manner.

E represents a bar, which is placed on the finger-bar A at the rear of the sickle C, and has lips *a* attached to it to serve as guides for the sickle, said lips catching over a rib or bar, *g*, secured to the rear part of the sickle. This bar E has two or more pins, *c*, attached to its under side, said pins projecting down through slots *d* in the finger-bar. These slots are shown clearly in Fig. 2, and it will be seen by referring to said figure that one portion of said slots have an oblique position and are parallel with each other, while the other parts are parallel with the front edge of the finger-bar.

The bar E has a rod, F, attached to its rear side, near one end, and this rod F is bent upward at its outer end and is fitted in a fork in the lower end of a lever, G, the fulcrum-pin *e* of which passes into an upright, H, attached to one end of a finger-bar, said lever G having a spring-catch, I, attached to it to fit into holes made in an arched bar on the top of the upright H, to secure the lever at either end of its movement.

From the above description it will be seen that by moving the lever G the bar E will also be moved, and in an oblique forward or backward direction, in consequence of the pins *c* extending down into the slots *d*, and hence the sickle C may be moved forward or backward, the forward being the working position, and the pins *c* being in the parts of the slots *d* which are parallel with the front edge of the finger-bar when the sickle is in that position and the sickle-teeth within the slots of the fingers or guards.

In case of the sickle becoming choked or clogged, the driver, from his seat, by actuating the lever G, draws the bar E, and consequently the sickle C, backward, the latter being entirely drawn out from the fingers or guards and all obstructions loosened thereby, and the sickle may be drawn back in a like manner in case of any obstructions, such as stones, stumps, &c., being in its path, and which would be liable to break its teeth.

The invention is simple, may be applied at a small cost, and will save much trouble and annoyance in those cases where the condition of the grass or grain is such as to have a tendency to clog or choke the sickle. Accidents by cutting the hands or fingers are also avoided by throwing the sickle back as described.

Having thus described my invention, I claim as new and desire to secure by Letters Patent—

The arranging or applying of a sickle to a grain or grass harvester, in the manner as herein shown and described or in any equivalent way, so that the sickle may be moved forward or backward on the finger-bar, substantially as and for the purpose set forth.

ALPHEUS LOWMILLER.

Witnesses:
SAMUEL DEVORE,
ANDREW MIKESELL.